Dec. 3, 1963 M. D. STEPATH 3,113,201
ELECTRIC ARC CUTTING AND GOUGING TOOL
Filed Oct. 23, 1959
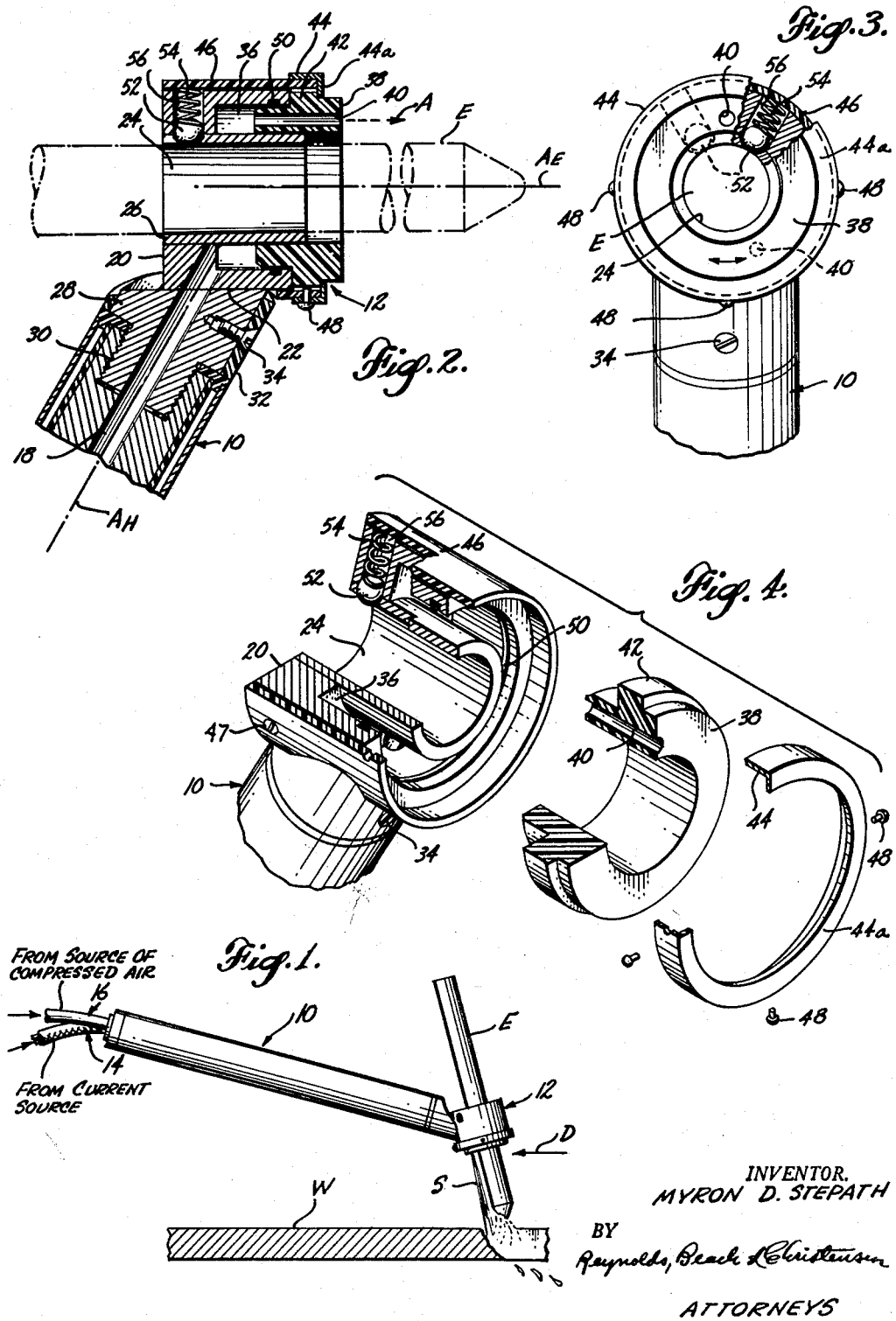
INVENTOR.
MYRON D. STEPATH
BY
Reynolds, Beach & Christensen
ATTORNEYS United States Patent Office 3,113,201
Patented Dec. 3, 1963

3,113,201
ELECTRIC ARC CUTTING AND GOUGING TOOL
Myron D. Stepath, 423 S. Mount Pleasant Ave.,
Lancaster, Ohio
Filed Oct. 23, 1959, Ser. No. 848,436
9 Claims. (Cl. 219—70)

This invention relates to an improved combination electrode holder and compressed air nozzle for cutting and gouging torches. A broad object of the invention is the provision of adjustable orifice positioning means permitting the torch to be worked efficiently in any of different positions and directions of movement along a work surface and to be worked readily and easily on variously oriented surfaces. The invention is herein illustratively described by reference to the presently preferred form thereof; however, it will be recognized that certain modifications and changes therein with respect to details may be made without departing from the underlying essentials involved.

Earlier work in the field of electric arc-compressed air cutting and gouging is represented in my Patent 2,726,309, October 28, 1955 and in Patent 2,706,236, April 25, 1955 issued jointly to myself and others. In the adaptation and extension of the basic techniques previously developed, it was determined that a need existed for a torch which could be held properly for optimum results while moving the torch in any of different directions and on overhead surfaces, sidewall surfaces and otherwise variously oriented surfaces. The present invention makes possible holding the torch in optimum working position under every condition likely to be encountered, by providing a specially arranged and adjustable compressed gas nozzle having an orifice which may be moved at will so as to maintain a certain relationship between the common plane of the handle axis and electrode axis and the direction of movement along the work. In this manner, regardless of the direction of movement and the work surface orientation the force of the gas jet removing the molten metal will always be directed and confined into the region between the electrode tip and the underlying surface of the work subjected to the heat of the electric arc.

A specific object is to provide a simple, durable and inexpensive torch having such adjustability.

A further and related object is an electrode holder and adjustable compressed gas nozzle combination wherein nozzle adjustment may be made easily and quickly with or without the electrode in the torch and without disturbing the position of the electrode or the elements which hold it in the torch; hence, parts which conduct heavy current need not move in relation to cooperating parts, thereby eliminating the possibility of corona or arcing within the bore.

A further object is an improved type torch achieving the foregoing objectives and having reliable and efficient means for holding the electrode and establishing low-resistance electrical contact therewith.

Still another object is a simple and effective means for both sealing and holding the rotary nozzle element in any of its different adjusted positions.

In accordance with this invention as herein disclosed the electrode socket means carried by the handle of the torch has an electrode reception bore which disposes the electrode with its axis at an angle to the handle axis, and preferably at least two spring actuated ball detents which press the electrode against one side of the bore from angularly spaced points about its periphery. An annular recess opening endwise of the socket means slidably receives an annular nozzle member having an orifice opening which communicates with the recess and is directed parallel to the electrode axis at a location adjacent thereto. Thus rotatability of the nozzle member permits changing the position of the orifice with relation to the plane common to the handle and electrode axes, and thereby with relation to direction of torch movement. An elastic O ring interposed between the overlapping surfaces of the exterior wall of the annular recess and the adjacent surfaces of the annular nozzle member, serves both to seal the latter and to hold it frictionally in any of its different rotated positions. A retainer collar having an inwardly directed flange slidably engaging an end surface of the rotary nozzle member holds the latter in the recess while permitting its adjustment as described.

These and other features, objects, and advantages of the invention, together with certain details of the preferred embodiment thereof will become more fully evident from the following description by reference to the accompanying drawings.

FIGURE 1 is an operational side view of the improved torch shown cutting along a metal plate.

FIGURE 2 is a longitudinal sectional view of the improved torch head and supporting end portion of the handle thereof.

FIGURE 3 is a face view of the torch head and handle portion shown in FIGURE 2.

FIGURE 4 is an exploded isometric view of the portion of the torch shown in FIGURE 2, with parts broken away to show details of construction.

Referring to the drawings, the torch generally comprises a handle 10 and a head 12 mounted on one end of the handle. The head comprises electrode holder means which disposes an electrode E with its longitudinal axis $A_E$ at an angle to the longitudinal axis $A_H$ of the handle 10 the angle, measured on the back side of the handle, being usually established at about 60 degrees for optimum ease and convenience in working with the torch efficiently. Electric current is supplied to the head through the handle by means of an electric cable 14. Compressed gas, usually air, is supplied to the head through the handle by way of a flexible hose 16, both the hose and the cable entering through the butt end of the handle. The handle details are of incidental concern herein, being in themselves no part of the present invention. Suffice it to note that the handle includes a longitudinal passage 18 extending from end to end and conducting compressed air from the hole 16 to the head 12. The head 12 comprises a barrel-like socket fitting 20 welded, brazed, or otherwise secured at 22 to the nippled fitting 28 carried by the handle. The socket fitting 20 has a central electrode reception bore 24. Preferably this bore is formed by the interior wall of a sleeve element 26 which is brazed or otherwise secured within the barrel fitting 20, the sleeve being usually of copper and the barrel fitting of brass.

For manufacturing convenience and interchangeability of heads, the nippled fitting 28 has a threaded nipple 30 which threads into a socket in the end portion of the handle proper. An insulating sleeve 32 surrounds the exposed part of the fitting 28, and is secured thereto by means of set screws 34.

The electrode socket fitting 20 is formed with an annular recess 36 therein surrounding sleeve element 26 and opening endwise in the direction of projection of the electrode from the socket. This annular recess is in communication with the compressed air conduit 18. Into this recess is fitted slideably the rotary ring-like nozzle member 38 to form an enclosed annular air chamber from the recess. Preferably a single orifice 40 is formed in the nozzle member which extends between its end faces in order to direct a stream of compressed gas close alongside the electrode E and parallel to its axis, as shown by arrow A.

The nozzle member 38, preferably of insulating material, has an annular rib 42 one end face of which abuts the end of the socket fitting 20 to limit penetration of the member 38 into the recess 36. The opposite end face of the rib 42, set back from its exposed end, provides a retaining surface against which the inwardly directed flange 44a of the retaining collar 44 bears in sliding contact in order to hold the nozzle member 38 in the recess 36. The projecting tip portion of the nozzle member 38 is accessible to the operator for gripping turning the nozzle member 38 between the fingers in order to vary the rotative position of the orifice opening 40.

A protective insulating sleeve 46 surrounds the socket fitting 20 and is fastened thereto by screws 47. The retaining collar 44 is secured by screws 48 to the sleeve 46. The fit of the nozzle member 38 in the recess 36 permits the nozzle member to be rotated freely. Limited frictional restraint on rotation is established by the provision of a rubber or rubber-like elastic O ring 50 interposed between the outer wall of the recess 36 and the overlapping exterior wall of the nozzle member 38. The O ring is received in an annular groove in the recess wall and projects sufficiently from that groove so that the O ring is compressed when the nozzle member 38 is inserted, thereby maintaining a gas seal and also tending to hold the nozzle member in any of its different assigned rotated positions.

The socket bore 24 is of a diameter slightly larger than the electrode diameter so that the latter may be inserted and removed freely. The electrode is removable retained in the bore and in solid or firm electrical contact with the bore wall by means of spring actuated ball detents 52 of which there are preferably two arranged in the socket at an angular spacing of preferably somewhat less than 90 degrees. The sleeve fitting 26 has wall apertures for the detent, which are slightly smaller than the diameter of the balls 52 so as to permit the latter to enter the bore 24 only to a limited extent. Actuating springs 54 bearing inwardly against the balls 52 are retained in the detent bores 56 by the encircling insulating sleeve 46 as shown. In order to avoid overheating and detempering of the detent springs 54 by passage of electric current the balls 52 may be of insulating material.

In use, the electrode holder is worked so that the issuing compressed air stream S, by proper preliminary adjustment of the rotary nozzle member 38, is located ahead of the electrode in relation to the direction of torch cutting or gauging movement D (FIGURE 1). This causes the force of the air stream to be directed primarily against the molten metal developing beneath the electric arc. In some cases the tool is moved along the work W by drawing it generally lengthwise of the handle toward the operator, as shown in FIGURE 1. In other cases the motion is generally lateral to the plane common to the electrode axis and handle axis, in which case the nozzle member 38 is rotated through 90 degrees from its position shown in FIGURE 1. The direction of such rotary adjustment will depend on whether the torch is to be moved toward the left or toward the right. These and other modes of operation for work on overhead surfaces, vertical surfaces, inclined surfaces, etc., and under varying conditions of space limitations, are made readily possible by the adjustability feature of the improved torch. It will also be evident that the parts and the assembly of those parts in the improved torch head are relatively simple and inexpensive yet perform the necessary functions in a reliable manner without adding unduly to the cost of the torch as compared with a torch having a fixed compressed air orifice.

These and other aspects of the invention will be evident to those skilled in the art from the foregoing description of the preferred embodiment thereof.

I claim as my invention:

1. An electrode holder for electric arc cutting and gouging apparatus comprising a handle portion, electrode socket means carried by and projecting from said handle portion and operable to grip and hold an electrode in operative position with its longitudinal axis angularly disposed relative to the longitudinal axis of said handle portion so an arc may be struck between the tip of such electrode and work adjacent to it, compressed air nozzle means mounted on said socket means and having therein an orifice opening adjacent said socket means and disposed at a location laterally offset from and directed substantially parallel to the axis of the socket means for directing a high velocity stream of gas along one side of and substantially parallel to the axis of the electrode to pass between the tip of the electrode and the work and forcibly blow melted metal from beneath the arc to effect a uniform action thereon, said socket means having an annular compressed gas chamber extending around the axis thereof, and conduit means carried by said handle means for conducting compressed gas to said chamber, said nozzle means having its orifice opening directly communicating with said chamber and said nozzle means being rotatable at will about the socket means axis, thereby to permit rotating said orifice opening about the electrode into different positions relative to a plane common to the electrode axis and handle means axis.

2. The electrode holder defined in claim 1, wherein the socket means comprises a member having an electrode-retaining bore extending therethrough adapted to slidably receive the electrode, the wall of said bore having a side opening therein, and detent means including a ball of larger diameter than said opening, spring means pressingly engaging said ball and urging the same through said opening to the extent permitted thereby and yieldably against the electrode, and retainer means holding said spring means pressed under stress against the ball.

3. The electrode holder defined in claim 1, wherein the socket means comprises a member having an electrode-retaining bore extending therethrough adapted to slidably receive the electrode, the wall of said bore having at least two side openings therein angularly displaced about the bore, and detent means in each opening including a ball of larger diameter than said opening, spring means pressingly engaging said ball and urging the same through said opening to the extent permitted thereby and yieldably against the electrode, and retainer means holding said spring means pressed under stress against the ball.

4. The electrode holder defined in claim 1, wherein the socket means annular chamber comprises an annular recess opening endwise therein around the electrode bore, and the nozzle means comprises an annular tip member seated in said recesses and means retaining said tip member rotatably in said recess, said tip member having an orifice opening through it which permits discharge of compressed gas from said recess endwise along the side of the electrode.

5. The electrode holder defined in claim 4, wherein the socket means annular recess is separated from the electrode by a sleeve portion slidably encircled by the tip member, and wherein the retaining means for the tip member comprises a collar secured to the socket means and having a flange directed inwardly, said tip member having a bearing surface facing endwise thereof slidably engaged by the flange, and said socket means and tip members having mutually engaged bearing surfaces facing endwise limiting insertion of the tip member in said annular recess.

6. The electrode holder defined in claim 5, and an elastic O ring carried interposed between the outer wall of the tip member and the overlapping outer wall of the socket means annular recess to effect a seal therebetween and frictionally hold the tip member in any of different rotated positions in which it is placed.

7. An electrode holder for electric arc cutting and gouging apparatus comprising a handle portion, electrode socket means carried by and projecting from said handle portion and operable to grip and hold an electrode in operative position with its longitudinal axis angularly disposed relative to the longitudinal axis of said handle portion so an arc may be struck between the tip of such electrode and work adjacent to it, compressed gas nozzle means mounted on said socket means to be rotated at will about the socket means axis and having therein an orifice opening adjacent said socket means and disposed at a location adjacent to and directed substantially parallel to the axis of the socket means for directing a high velocity stream of gas along one side of and substantially parallel to the axis of the electrode to pass between the tip of the electrode and the work and forcibly blow melted metal from beneath the arc to effect a uniform action thereon, and conduit means carried by said handle means for conducting compressed gas to the location of said socket means, said socket means including a gas chamber intercommunicating between said conduit means and said nozzle means in all positions of rotation of the nozzle means about the socket means axis, thereby to permit rotating said orifice opening about the electrode into different positions relative to a plane common to the electrode axis and handle means axis.

8. An arc gouging and cutting tool for use in arc cutting of metals comprising a body having a handle portion and an electrically conductive barrel portion having a bore adapted to receive an electrode, means for selectively securing said electrode in said barrel portion and controlling relative movement thereof, an axially hollow tip portion joined coaxially with said barrel portion and rotatable relative thereto about their common axis, said tip portion and said barrel portion having respective mutually spaced surfaces therewithin cooperatively defining an enclosed annular gas chamber encircling said bore, gas conduit means supplying gas under pressure to said annular chamber, and gas nozzle means in said tip portion communicating with said annular chamber in various different positions of rotation of the nozzle means, said nozzle means having an orifice directed outwardly substantially parallel to the axis of said bore and spaced therefrom for the ejection of gas along a path selected by rotative positioning of said tip portion.

9. An arc gouging and cutting tool for use in arc cutting of metals comprising a body having a handle portion and an electrically conductive barrel portion having a bore adapted to receive an electrode, means for selectively securing said electrode in said barrel portion and controlling relative movement thereof, said latter means comprising a reciprocable detent element mounted in said barrel and resiliently urged against an electrode within the bore, said detent element comprising electrical insulation material preventing flow of electrical current therethrough by application of voltage between such electrode and said barrel, an axially hollow tip portion joined coaxially with said barrel portion and rotatable relative thereto about their common axis, said tip portion and said barrel portion having respective mutually spaced surfaces therewithin cooperatively defining an enclosed annular gas chamber encircling said bore, gas conduit means supplying gas under pressure to said annular chamber in various different rotative positions of the nozzle means, and gas nozzle means in said tip portion communicating with said annular chamber, said nozzle having an orifice directed outwardly substantially parallel to the axis of said bore and spaced therefrom for the ejection of gas along a path selected by rotative positioning of said tip portion.

References Cited in the file of this patent
UNITED STATES PATENTS

| | | |
|---|---|---|
| 2,706,236 | Stepath | Apr. 12, 1955 |
| 2,726,309 | Stepath | Dec. 6, 1955 |
| 2,784,293 | Adams | Mar. 5, 1957 |